United States Patent [19]

Mineau

[11] 4,216,091
[45] Aug. 5, 1980

[54] WATER AERATOR

[76] Inventor: Paul J. Mineau, 825 S. Baird St., Green Bay, Wis. 54301

[21] Appl. No.: 923,460

[22] Filed: Jul. 10, 1978

[51] Int. Cl.² .............................. C02B 3/08; B01F 3/04
[52] U.S. Cl. ...................... 210/175; 210/194; 210/219; 210/220; 210/237; 210/241; 210/242 A; 261/91; 261/120
[58] Field of Search ................. 210/15, 60, 63 R, 194, 210/219, 242 A, 175, 220, 237, 241; 261/91, 120

[56] References Cited

U.S. PATENT DOCUMENTS

| | | | |
|---|---|---|---|
| 2,077,445 | 4/1937 | Wallace et al. | 261/93 |
| 2,650,810 | 9/1953 | Nordell | 210/237 X |
| 3,086,715 | 4/1963 | Mineau et al. | 261/91 X |
| 3,218,042 | 11/1965 | Ciabattari et al. | 210/242 A X |
| 3,722,687 | 3/1973 | Stebbins et al. | 210/219 |
| 3,794,303 | 2/1974 | Hirshon | 261/91 X |
| 3,836,130 | 9/1974 | Earhart et al. | 261/91 X |
| 3,846,516 | 11/1974 | Carlson | 261/120 X |
| 3,871,581 | 3/1975 | Dively | 261/91 X |
| 4,030,859 | 6/1977 | Henegar | 261/91 63 |
| 4,086,306 | 4/1978 | Yoshinaga | 261/120 X |

FOREIGN PATENT DOCUMENTS 976805  12/1964  United Kingdom .................... 210/197

Primary Examiner—Robert H. Spitzer
Attorney, Agent, or Firm—John E. McGarry

[57] ABSTRACT

An aerator for bodies of water having a housing with a concave top wall, an annular buoyant core and a plurality of aerator pumps which draw water from beneath the core and spray the water in vertically spaced sheets onto the top wall of the housing. A telescoping tube extends from the central opening of the top wall down through the core and down near the bottom of the lake. An impeller is provided in the telescoping tube for driving the water down through the tube and out through the outlet opening thereof. A heater is provided below the top wall and on the outside edges of the aerator pump to prevent ice formation thereon. A screened enclosure is provided beneath the buoyant core through which filtered water can be drawn by the aerator pump. A plurality of legs are adjustably secured to the housing for supporting the housing on the bottom of the lake bed. A wheel bearing suspension and a tongue are secured to the underside of the housing so that the housing can be drawn like a trailer to location, placed in the water and removed from the water like an ordinary boat.

18 Claims, 5 Drawing Figures

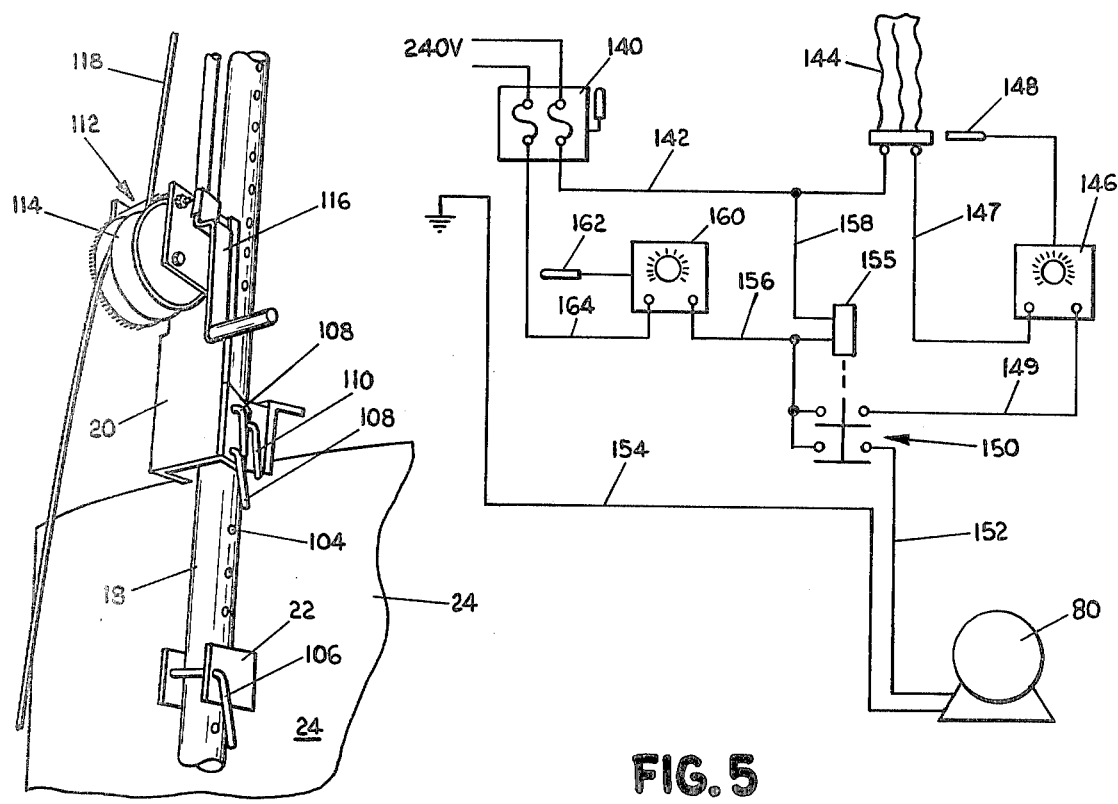
FIG. 3
FIG. 5
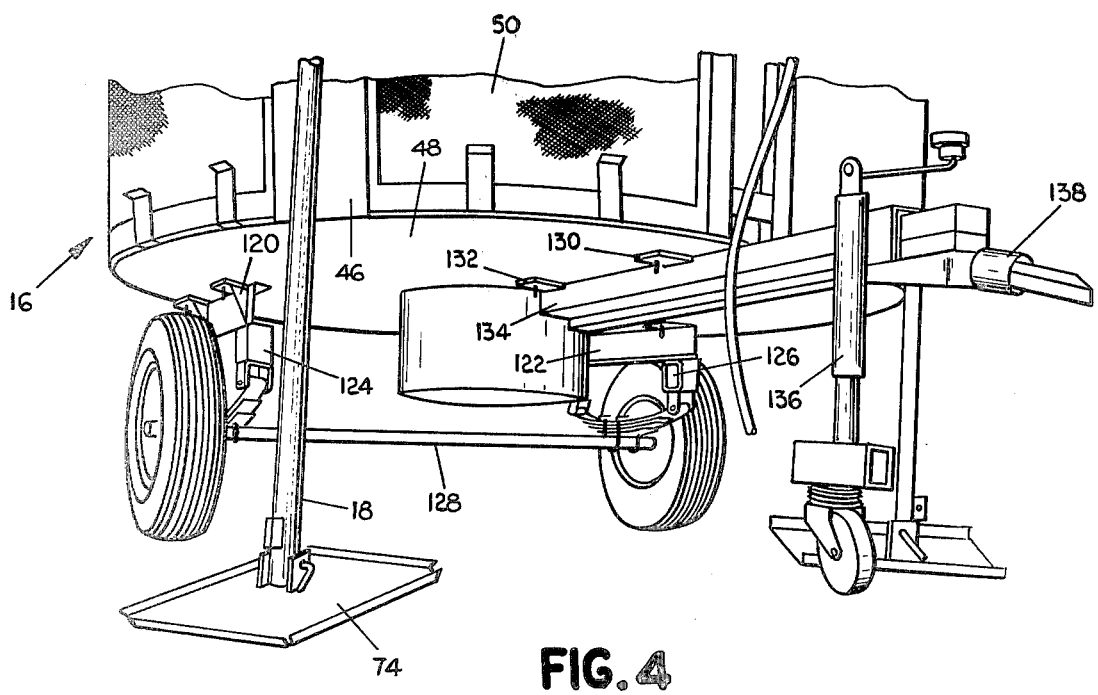
FIG. 4

WATER AERATOR

BACKGROUND OF THE INVENTION

1. Field of the Invention

This invention relates to aerators for ponds, lakes and the like. In one of its aspects, the invention relates to an aerator for turbulently aerating water and circulating the aerated water to the bottom portion of a lake.

2. State of the Prior Art

Lack of oxygen is one of the greatest of fish killers, both in summer and winter. During the summer, water will usually absorb oxygen during cool nights. However, several hot, humid nights can reduce the oxygen in water to a danger point. for this reason, aerators have been developed to return oxygen to bodies of water.

One such aerator is disclosed in U.S. Pat. No. 3,086,715 to Paul J. Mineau et al, issued Apr. 23, 1963. This aerator is principally designed for small trout ponds. The Mineau et al aerator pump draws water up through a tube and sprays the water into a plurality of vertically spaced sheets of water to entrain the air in the water.

Larger lakes are also subject to effects of oxygen loss, including the loss of oxygen to eutrophication. Aerators typically take water from a top portion of the lake and spray the water along the top surface thereof in a manner similar to the Mineau et al aerator pump. For example, see Henegar U.S. Pat. No. 4,030,859 (issued June 21, 1977) and Earhart et al U.S. Pat. 3,836,130 (issued Sept. 17, 1974). Henegar provides a telescoping tube from which water can be drawn from a bottom portion of the lake and aerated at the top of the lake. Earhart et al provide an electrical heater in a difuser plate for inhibiting formation of ice on the aerator. However, in large bodies of water, lack of oxygen near the bottom of the lake can be acute.

The patent to Hirshon U.S. Pat. No. 3,794,303 (issued Feb. 26, 1974) discloses a floatation ring aerator with an intake column and a discharge column. A head on one column is provided by the introduction of air into the other column which serves both to raise and to aerate the water therein. In one embodiment, mechanical means are provided to circulate the water through an aeration means and deposit the thus aerated water near the bottom of the lake.

Heretofore, the efficient technique of spraying the water through the air to entrain air therein has not been utilized to provide aerated water near the bottom of a lake.

SUMMARY OF THE INVENTION

According to the invention there is provided an aerator for efficiently aerating bodies of water in the summer or winter by providing aerated water near the bottom of the lake body. The aerator comprises a housing with sides, a bottom and a concave top wall. At least a portion of the housing has an annular core of buoyant material for buoyantly supporting the aerator in a body of water. The top wall of the housing slopes downwardly to a central opening at which a central conduit extends downwardly through the central portion of the housing and therebeneath. A plurality of aerator pump means are spaced about and a distance from, the central opening in the top wall, each of the aerator pump means having means to draw water from beneath the annular core and spray the water through the air above the top wall so that is is deposited on the top wall and flows to the central opening therein. Means are provided for driving the water downwardly through the conduit to disperse the thus aerated water below the housing.

Conveniently, the aerator pump means are positioned in the annular core and extend therethrough. Further, each of the aerator pumps have means to spray a plurality of vertically spaced sheets of water through the air onto the top wall.

In a preferred embodiment, the housing comprises a frame which extends down below the annular core, the frame having a side wall and a bottom wall. At least one of the side walls and bottom wall has screened openings to allow water to freely flow into the lower portion of the housing which is otherwise closed so that foreign matter is excluded from the frame interior. Desirably, the screened openings are provided in the side wall and comprise panels which slide in the frames.

According to one aspect of the invention, heating means are provided beneath the housing top wall to prevent formation of ice therein. Means are provided for controlling the temperature of the heating means to maintain the temperature of the top wall above freezing. Further, means are provided to heat the outside edge of the aerator pump means to a temperature above the freezing temperature to prevent formation of ice on the pump means. Desirably, the heating means are provided by conduits, a source of heated water and means for pumping heated water through the conduits.

In accordance with another aspect of the invention, a plurality of legs are adjustably secured to the housing so that the housing can be supported through the legs by the bottom of the lake. The legs are adjustable to accommodate different depths of the lake and also for ease of transport of the aerator. Further, a winch is provided to raise the legs with respect to the housing.

In order to accommodate lakes of different depths, a second conduit is provided in telescoping relationship to the central conduit for dispersing the aerated water near the bottom of the lake.

Still further according to the invention, a wheel suspension is mounted on the bottom wall of the housing for supporting the aerator when the same is out of water. Further, a tongue is secured to the bottom of the housing and extends outwardly thereof. A coupler is provided on the tongue for hitching the tongue to a towing vehicle so that the aerator can be easily towed to the installation site, easily placed in the lake and easily removed from the lake.

BRIEF DESCRIPTION OF THE DRAWINGS

The invention will now be described with reference to the accompanying drawings in which:

FIG. 3 is an enlarged perspective view of the aerator shown in FIG. 1, showing the attachment of the legs to the aerator;

FIG. 4 is an enlarged underside view of the aerator shown in FIG. 1, illustrating the trailer axle and tongue mountings thereon for transport thereof; and FIG. 5 is an electrical schematic of the electrical circuit for operating the aerator.

DESCRIPTION OF THE PREFERRED EMBODIMENT

Figure 1:
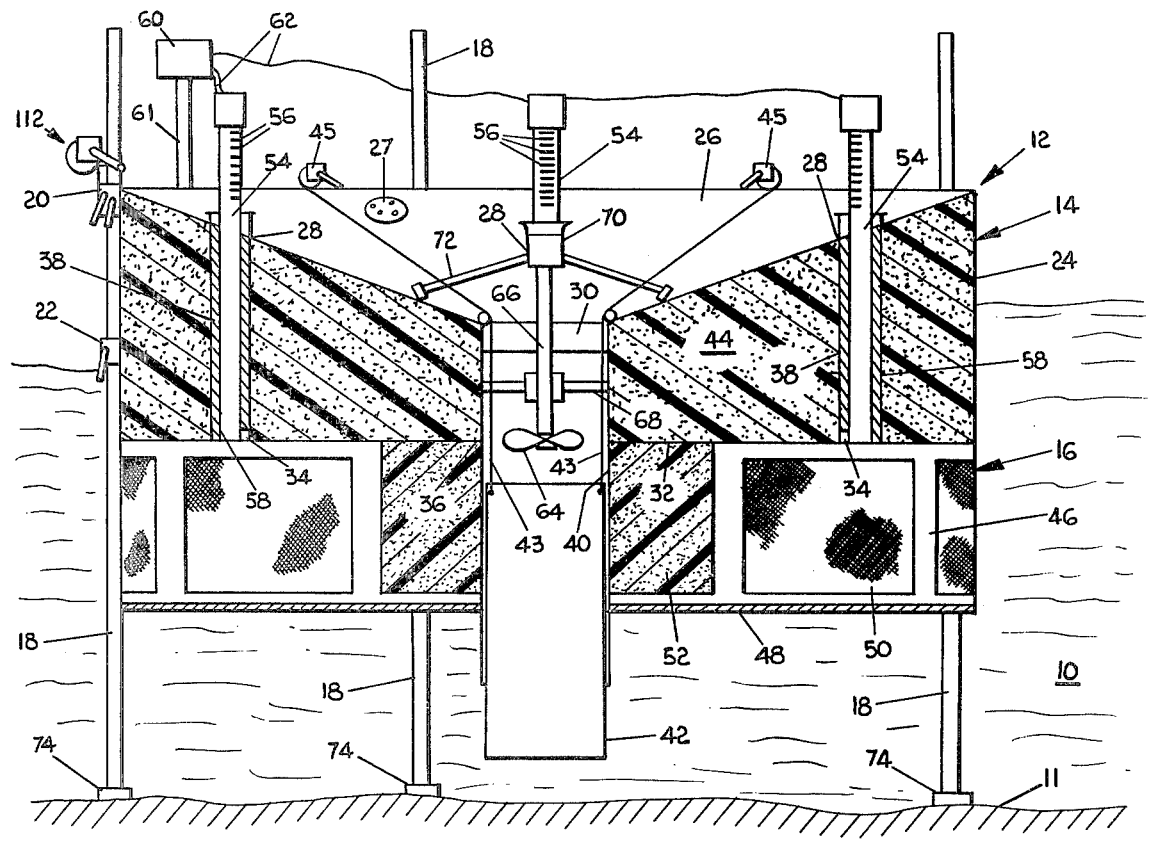
FIG. 1 is a cross-sectional view of an aerator assembly according to the invention positioned in a body of water.

Referring now to the drawings and to FIG. 1 in particular, there is illustrated an aerator assembly 12 shown in cross-section and positioned in a body of water 10 above a lake bottom 11. The aerator assembly 12 comprises a top section 14, a bottom section 16 and a plurality of adjustable legs 18 mounted to the aerator through brackets 20 and 22. Each of the legs has a foot 74 which rests on the lake bottom 11.

The top section 14 of the aerator assembly comprises a cylindrical shell 24 with a concave top surface 26 having four equally spaced openings 28 and a central opening 30 therein. A bottom surface 32 has a plurality of spaced openings 34 in registry with the openings 28 of the top surface 26 and a central opening 36 in registry with the central opening 30 of the top surface 26. Vertical tubes 38 extend vertically through the top section 14 from opening 34 and through the openings 28 above the top of surface 26. A vertical tube 40 extends from the central opening 30 in the top surface 26, through the opening 36 in the bottom surface 32 and through the bottom section 16 as well. A telescoping tube 42 extends from the bottom of the tube 40 down to a point near the lake bottom. The telescoping tube 42 is adjustable with respect to tube 40 by means of cables 43 which support the tube 42. The cables 43 are secured to the tube 42 at the end thereof, extend over pulleys at opening 30 and are wound around a conventional ratchet winch 45. In lieu of the telescoping tube 42, pipe sections (not shown) of equal diameter to tube 40 can be joined in conventional fashion to the bottom of tube 40 to extend the aerated water conduit near the bottom of the lake.

With the exception of tubes 38 and 40, the entire interior space of the top section 14 is filled with a low density buoyant foam 44. Access ports 27 are provided in the top surface 26 for filling the top section 14 with foam.

The bottom section 16 comprises a cylindrical frame 46 which is attached to the cylindrical shell 24 at the top thereof and to a bottom panel 48 at the bottom thereof. The frame 46 has a number of spaced openings in which are slidably mounted a number of screen panels 50. To this end the frame has guides which retain the screen panels 50 for upward sliding movement with respect to the frame 46. An annular plug 52 of buoyant foam encircles the tube 40 in the bottom section 16 to provide additional buoyancy to the aerator assembly. As illustrated in FIG. 1, the plug 52 has a diameter which is less than the diametrical spacing between the openings 34 and the bottom surface 32. Thus, the area between the frame 46 and the openings 34 is open and water is allowed to pass through the screen 50 into the open annular space. A number of aerator pumps 54 are mounted within each of the vertical tubes 38 through an annular foam filler 58. The aerator pumps 54 are substantially identical to the aerator pump in U.S. Pat. No. 3,086,715 to Paul J. Mineau et al, issued Apr. 23, 1963, which patent is incorporated herein by reference. Briefly, the aerator pumps draw water up through the bottom thereof and propel the water laterally from the top portion thereof through a vertical stack of openings 56. A control box 60 is mounted on a pole 61 above the top section 14 and supplies electrical power to the motors of aerators 54 through wires 62.

An impeller 64 is mounted on a shaft 66 within the tube 40. A bearing support 68 is secured to the upper end of the tube 40 and provides a bearing for the impeller shaft 66. A motor 70 is mounted on motor supports 72 above the opening 30 in the top surface 26 and is connected to the impeller shaft 66 to drive the impeller 64. Electrical power is supplied to the motor 70 from control box 60 through wires (not shown). The impeller 64, when driven by motor 70, forces the aerated water downwardly through the tubes 40 and 42 to the bottom portion of the body of water 10. Alternatively, a submersible pump can be mounted in the tube 40 in lieu of the motor 70 and impeller 64.

Figure 2:
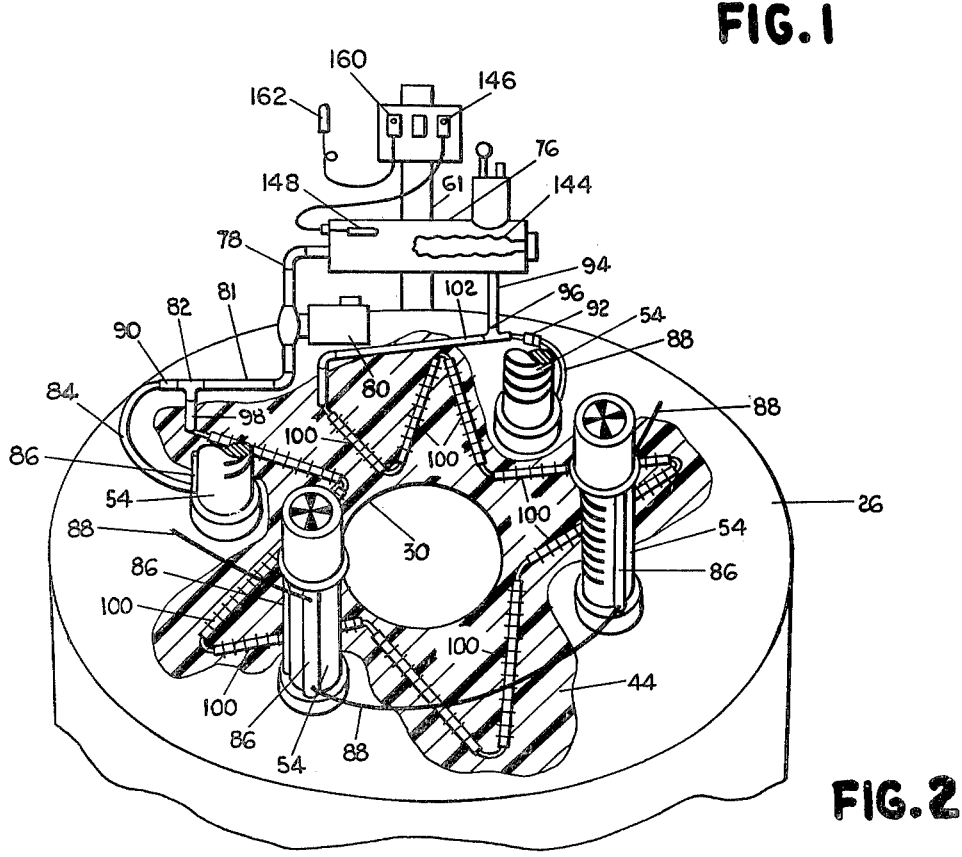
FIG. 2 is a top perspective view of the aerator shown in FIG. 1, partially schematic, and with the top surface of the aerator partially broken away to show structure lying beneath the top surface.

Reference is now made to FIG. 2 for a description of the means by which the aerators and top surfaces are kept free of ice. In FIG. 2, the top surface 26 has been cut away in a central portion thereof to reveal the undersurface thereof. A water tank 76 is mounted on pole 61 and has an outlet pipe 78 connected at one end thereof. A pump 80 is connected to the outlet pipe 78 and pumps water through pipe 81 to a Tee pipe connection 82. A flexible hose 84 having a hot water flow regulator valve 90 connects the pipe Tee 82 to the bottom of a water manifold 86 which is vertically positioned along the top portion of the aerator pump 54 on a surface obverse from the openings 56. The water manifold 86 functions to heat the back surface of the aerator pumps 54 to keep it free from ice when the temperature is below freezing. Flexible hoses 88 are connected between each of the manifolds 86 of each of the aerator pumps 54 and between the last of the aerator pumps 54 in the circuit and a Tee pipe connection 96. A hot water flow valve 92 is provided in the last hose 88 in the circuit at the Tee pipe connection 96 to control the flow of water through the hoses 88. A return pipe 94 connects the Tee pipe connection 96 with the bottom of the water tank 76. Thus, water from the water tank 76 is circulated through the flexible hoses 84, through the manifolds 86, the flexible hoses 88 and back to the water tank through the return pipe 94. The water in the water tank is heated by a resistance heater 134.

A pipe connection 98 connects the Tee 82 with a series of hot water conductors which are positioned in a zigzag fashion around the top of the aerator top section 14 just beneath the top surface 26. The hot water conductors 100 are interconnected and the end conductor is connected to the Tee pipe connection 96 through connector pipe 102. Thus, water heated in the water tank 76 is circulated through the conductors 100 to heat the top surface 26 in an area extending from the opening 30 to the aerator pumps 54.

Referring now to FIG. 3, the adjustable legs 18 have a series of equally spaced holes 104 extending horizontally therethrough. Removable retainer pins 106 and 108 are provided in brackets 22 and 20, respectively, to retain the adjustable legs 18. A locking pin 110 extends through the sides of the bracket 20 and through one of the holes 104 in the leg 18 to lock the leg in a given position with respect to the aerator top section 14. A ratchet winch 112 of conventional design is mounted to the top of bracket 20. The winch 112 comprises a drum 114 and a handle 116 for rotating the drum. A cable 118 is wound around the drum and is connected to the top of the leg 18. Thus, when pin 110 is removed, and handle 116 is wound, the cable raises or lowers the leg 18. After the leg is positioned in the desired position, either raised for movement of the aerator or lowered for contact with the lake bottom, pin 110 is inserted through the hole in the bracket 20 and through one of the holes 104 in the leg 18.

Reference is now made to FIG. 4 which shows a perspective view of the underside of the aerator out of the water environment and with the tube 42 removed. A pair of mounting brackets 120 and 122 are secured to the bottom panel 48 of the aerator bottom section 16. Spring suspension systems 124 and 126 are mounted on the mounting brackets 120 and 122 respectively and carry an axle assembly 128 including wheels. Brackets 130 and 132 mount a tongue 134. A parking jack 136 is mounted to the outer end of the tongue 134 and a coupler 138 is mounted to the very outer end of the tongue 134. The coupler 138 is a conventional coupler which, when open, is mountable on a ball hitch so that the aerator can be pulled by a vehicle upon closing of the coupler 138. Thus, the aerator can be towed on the axle assembly 128 to the point of location in the water at which point it can be backed into the water on a public access ramp. The aerator can then be floated to an appropriate location for use. The suspensions 124, 126 and the tongue 134 are intended to stay on the aerator in the water so that the aerator can be easily removed for repair. For the sake of simplicity the suspensions and tongue have not been shown in FIG. 1.

Reference is now made to FIG. 5 for a description of the electrical system to control the water temperature which is supplied to the water manifolds 86 and to the hot water conductors 100. Electrical current at 240 volts is supplied through a breaker box 140 and through lead 142 to an electrical heating element 144. A water heater control 146 is connected to the heater 144 and is controlled by a water temperature sensor 148 which is positioned within the water tank 76 (FIG. 2). The water heater control is adjustable from 0° to 250° and can be set in accordance with mean air temperature to maintain the water temperature at about 175° F. The water heater control 146 is connected to lead 156 through relay 150 and lead 149. The relay is operated by a coil 155 which is connected to lead 156 at one end thereof and to lead 142 through lead 158 at the other end thereof. The water pump 80 is connected to the lead 156 through the relay 150 and lead 152. Water pump 80 is also provided with a ground lead 154. An air temperature controller switch 160 is provided in the power line between leads 164 and 156. The air temperature controller 160 is controlled by the air temperature sensor 162.

In operation of the electrical circuit shown in FIG. 5, electrical energy at 240 volts is supplied through the breaker box 140. A switch (not shown) of conventional design can be provided on the box to open or close the circuit. If the air temperature as sensed by the air temperature sensor 162 is below a set temperature, for example, 40° F., the air temperature controller 160 will close the circuit between the leads 156 and 164. The air temperature controller 160 has an adjustable control and the temperature can be varied so that the circuit opens at a lower or a higher temperature. The current then flows through the temperature controller 160, through lead 156, through coil 155, lead 158 and to lead 142, thus completing the circuit. Energization of the coil 155 closes the relay 150 to supply current to the water pump 80 and to the water heater controller 146. The water pump will circulate the water from the tank 76 through the hoses 84, through water manifolds 86, through the flexible hoses 88 to heat the aerator pumps 54 (See FIG. 2). At the same time, the pump will pump the water from the tank 76 through the hot water conductors 100 to maintain the temperature of the top surface 26 of the aerator pumps at a temperature above freezing. If the water temperature in the tank 76, as detected by the water temperature sensor 148, is about 173° F., the water heat controller 146 will close so that electrical current is supplied to the electrical heating element 144 through lead 147. Thus, the electrical heating element 144 heats the water in the tank 76 and the water is circulated as described above. If the temperature of the water rises above 175°, as detected by the water temperature sensor 148, the water heat controller will open to stop the current flow to the electrical heating element 144.

Current is continuously supplied to the aerator pumps 54 from the control box 60. Water entering the bottom section 16 through the screen 50 will be drawn up through the aerators 54 and be sprayed out through the openings 56 in a wide spray pattern onto the top surface 26. The water will flow downwardly along the surface and enter the tube 40 through opening 30. The water in the tube 40 is continuously forced downwardly through the telescoping tube 42 by the impeller 64 to a bottom portion of the lake so that the aerated water is delivered to the bottom portion of the lake.

Reasonable variation and modification are possible within the scope of the foregoing disclosure and drawings without departing from the spirit of the invention which is defined in the accompanying claims.

The embodiments of the invention in which an exclusive property or privilege is claimed are defined as follows:

1. An aerator for bodies of water comprising in combination:
    a housing having sides, a bottom wall with a central opening and a generally horizontal concave top wall with a central opening;
    a core of buoyant material at least in the upper portion of the housing, the core having a vertical central bore therethrough;
    the top wall of the housing being above the core of buoyant material and sloping downwardly to the central opening;
    the core of buoyant material being sufficient to maintain the top wall above the surface of the body of water in which the aerator is placed;
    a conduit extending down from the central opening in the top wall through the core and through the bottom wall beneath the housing;
    a plurality of aerator pump means mounted in the housing spaced from and about the central opening in the top wall, each of the aerator pump means having means to draw water from beneath the core and to spray the water through the air above the top wall so that it is deposited thereon and flows to the central opening therein; and
    means to disperse the aerated water in the conduit below the housing.

2. An aerator according to claim 1 wherein the aerator pump means are positioned in the annular core and extend therethrough.

3. An aerator according to claim 2 wherein each of the aerator pump means has means to spray a plurality of vertically spaced sheets of water through the air onto the top wall.

4. An aerator according to claim 3 wherein the housing further comprises a frame extending down below the annular core, the frame having a side wall and a bottom wall; at least one of the side and bottom walls having a screened opening to allow water to freely flow into the frame which is otherwise closed so that foreign matter is excluded from the frame interior.

5. An aerator according to claim 4 wherein the screen openings comprise panels and means slidably mounted mounting the screen panels to the frame for access to the interior of the frame.

6. An aerator according to claim 2 wherein the housing further comprises a frame extending down below the annular core, the frame having a side wall and a bottom wall; at least one of the side and bottom walls having screened openings to allow water to freely flow into the frame which is otherwise closed so that foreign matter is excluded from the frame interior.

7. An aerator according to claim 1 and further comprising heating means positioned beneath the housing top wall to prevent formation of ice thereon; and means for controlling the temperature of the heater means to maintain the temperature of the top wall above freezing.

8. An aerator according to claim 7 and further comprising a second heater means to heat the outside edge of the pump means above the top wall of the housing to prevent ice formation on the pump means.

9. An aerator according to claim 8 wherein the first and second heater means comprise heater conduits and means for pumping heated water through the heater conduits.

10. An aerator according to claim 7 wherein the heater means comprises heater conduits and means for pumping heated water through the heater conduits.

11. An aerator according to claim 1 and further comprising a plurality of legs secured to the housing and means for adjusting the legs with respect to the housing so that the bottom of the legs can extend down to the bottom of the body of water and the aerator can be supported by the ground beneath the body of water through the legs.

12. An aerator according to claim 11 and further comprising winch means to raise the legs with respect to the housing.

13. An aerator according to claim 11 and further comprising a second conduit telescopingly received within the first conduit in the central portion of the housing for dispersing the aerated water near the bottom of the body of water.

14. An aerator according to claim 1 and further comprising a second conduit telescopingly received within the first conduit in the central portion of the housing for dispersing the aerated water near the bottom of the body of water.

15. An aerator according to claim 1 and further comprising a wheel suspension mounted on the bottom wall of the housing for supporting the aerator when the same is out of the water.

16. An aerator according to claim 15 and further comprising a tongue secured to the bottom wall of the housing and extending outwardly of the side walls thereof; and means on the tongue for hitching the tongue to a towing vehicle so that the aerator can be drawn by a towing vehicle on the wheel suspension.

17. An aerator according to claim 16 wherein:
the aerator pumps are positioned in the annular core and extend therethrough, each of the aerator pumps has means to spray a plurality of vertically spaced sheets of water through the air onto the top wall;
the housing further comprises a frame extending down below the annular core, the frame having a side wall and a bottom wall, at least one of the side and bottom walls having screened openings to allow water to freely flow into the frame which is otherwise closed so that foreign matter is excluded from the frame interior; heating means are positioned beneath the housing top wall to prevent formation of ice thereon, and heater means are provided on the outside edge of the pump means above the top surface of the housing to prevent formation of ice on the aerator pump means, the first and second heater means comprising a heater conduit and means for pumping heated water through the heated conduits;
means to maintain the temperature of the top wall and the outside edge of the aerator pump means above freezing;
a plurality of legs secured to the housing and means for adjusting the legs with respect to the housing so that the bottom of the legs can extend down to the bottom of the body of water and the aerator can rest on the legs; and
a second conduit telescopingly received within the first conduit in the central portion of the housing and adjustable with respect thereto for dispersing aerated water near the bottom of the body of water.

18. An aerator for bodies of water comprising in combination:
a housing having sides, a bottom wall with a central opening and a generally horizontal concave top wall with an opening;
a core of buoyant material at least in the upper portion of the housing, the core having a vertical central bore therethrough;
the top wall of the housing being above the core of buoyant material and sloping downwardly to the opening;
the core of buoyant material being sufficient to maintain the top wall above the surface of a body of water in which the aerator is placed;
a conduit extending down from the opening in the top wall through the core and through the bottom wall beneath the housing;
at least one aerator pump means mounted in the housing spaced from the opening in the top wall, the or each aerator pump means having means to draw water from beneath the core and to spray the water in a plurality of vertically spaced sheets through the air above the top wall so that it is deposited thereon and flows to the opening therein; and
means to disperse the aerated water in the conduit down below the housing near the bottom of the lake.

* * * * *